(12) United States Patent
Yahia

(10) Patent No.: US 9,897,366 B2
(45) Date of Patent: Feb. 20, 2018

(54) DEVICE FOR CONTROLLING THE FLOW OF A COOLANT, AND CIRCUIT INCLUDING SUCH A DEVICE

(75) Inventor: Mohamed Yahia, Paris (FR)

(73) Assignee: VALEO SYSTEMES THERMIQUES, Le Mesnil Saint Denis (FR)

( * ) Notice: Subject to any disclaimer, the term of this patent is extended or adjusted under 35 U.S.C. 154(b) by 958 days.

(21) Appl. No.: 14/240,575

(22) PCT Filed: Aug. 9, 2012

(86) PCT No.: PCT/EP2012/003408
§ 371 (c)(1),
(2), (4) Date: Apr. 10, 2014

(87) PCT Pub. No.: WO2013/026536
PCT Pub. Date: Feb. 28, 2013

(65) Prior Publication Data
US 2014/0298840 A1    Oct. 9, 2014

(30) Foreign Application Priority Data

Aug. 25, 2011    (FR) ...................................... 11 02593

(51) Int. Cl.
*F25D 17/02* (2006.01)
*F25B 49/02* (2006.01)
(Continued)

(52) U.S. Cl.
CPC ......... *F25D 17/02* (2013.01); *B60H 1/00485* (2013.01); *B60H 1/00885* (2013.01); *F25B 49/02* (2013.01); *G05D 23/023* (2013.01)

(58) Field of Classification Search
CPC ............ B60H 1/00485; B60H 1/00885; G05D 23/023; F25B 49/02; Y10T 137/1963; F25D 17/02
(Continued)

(56) References Cited

U.S. PATENT DOCUMENTS 2,409,661 A * 10/1946 Carter ................... F25B 39/028
138/37
2,617,596 A * 11/1952 Hans ....................... F28D 1/024
235/42
(Continued)

FOREIGN PATENT DOCUMENTS

EP    1 334 853 A1    8/2003
FR    2 276 957 A1    1/1976
(Continued)

OTHER PUBLICATIONS

International Search Report for Application No. PCT/EP2012/003408 dated Oct. 4, 2012, 5 pages.
(Continued)

*Primary Examiner* — Kun Kai Ma
(74) *Attorney, Agent, or Firm* — Howard & Howard Attorneys PLLC

(57) ABSTRACT

The invention relates to a device (1) for controlling the flow of a coolant in a circuit (20) and capable of being exposed to a flow (26) of outside air at the front surface of a vehicle (21), including a means for controlling the flow of coolant, at least one opening of which is placed under the control of a thermostatic detection means, characterized in that the thermostatic detection means includes a thermally conductive surface (9) exposed to said flow (26) of outside air. The invention also relates to the coolant circuit (20) including said control device (1), and to a vehicle (21) provided with such a circuit. The invention can be used for motor vehicles.

11 Claims, 1 Drawing Sheet

(51) Int. Cl.
  *B60H 1/00* (2006.01)
  *G05D 23/02* (2006.01)
(58) Field of Classification Search
  USPC .................................... 137/79, 78.1, 78.5
  See application file for complete search history.

(56) References Cited

U.S. PATENT DOCUMENTS

| | | | | |
|---|---|---|---|---|
| 2,816,711 | A * | 12/1957 | Woods | F01P 7/167 236/34 |
| 2,966,044 | A * | 12/1960 | Orville | B60H 1/00485 251/33 |
| 3,389,553 | A * | 6/1968 | Hardy | B64D 13/04 244/59 |
| 3,469,450 | A * | 9/1969 | Piemontesi | G05D 23/125 236/99 D |
| 3,485,473 | A * | 12/1969 | Fieni | B60H 1/00485 251/205 |
| 3,633,420 | A * | 1/1972 | Holzem | G01F 15/026 388/906 |
| 3,835,876 | A * | 9/1974 | Laakaniemi | F15C 3/04 137/82 |
| 3,841,551 | A * | 10/1974 | Ota | G05D 23/185 123/406.7 |
| 3,855,836 | A * | 12/1974 | Takahashi | F25B 41/04 62/217 |
| 4,244,343 | A * | 1/1981 | Yamaguchi | F02M 23/10 123/552 |
| 4,646,532 | A * | 3/1987 | Nose | F25B 41/062 236/92 B |
| 5,127,237 | A * | 7/1992 | Sendo | F25B 41/062 236/92 B |
| 5,269,264 | A * | 12/1993 | Weinhold | B60K 11/085 123/198 E |
| 5,615,560 | A * | 4/1997 | Inoue | B60H 1/00485 236/92 B |
| 5,873,256 | A * | 2/1999 | Denniston | B60H 1/00414 62/244 |
| 5,916,250 | A * | 6/1999 | Osthues | F25B 41/062 62/114 |
| 5,931,377 | A * | 8/1999 | Kang | B60H 1/00485 236/92 B |
| 5,971,290 | A * | 10/1999 | Echigoya | B60H 1/00485 237/12.3 A |
| 5,979,780 | A * | 11/1999 | Malone | F25B 41/04 236/92 B |
| 6,435,273 | B1 * | 8/2002 | Futernik | B60H 1/00007 165/202 |
| 6,902,391 | B2 | 6/2005 | Bauer et al. | |
| 7,036,744 | B2 * | 5/2006 | Hirota | F25B 41/062 236/92 B |
| 9,696,070 | B2 * | 7/2017 | Ohta | F25B 41/04 |
| 2004/0194949 | A1 * | 10/2004 | Ban | B60H 1/00314 165/287 |
| 2004/0200610 | A1 * | 10/2004 | Hara | B60H 1/00314 165/202 |
| 2006/0006247 | A1 * | 1/2006 | Roman | G05D 23/023 236/93 A |
| 2006/0144047 | A1 * | 7/2006 | Inaba | F02N 19/10 60/618 |
| 2006/0225417 | A1 * | 10/2006 | Pantow | F01P 5/12 60/599 |
| 2008/0202722 | A1 * | 8/2008 | Feuerecker | B60H 1/00907 165/41 |
| 2010/0163637 | A1 * | 7/2010 | Ikegami | F25B 41/062 236/92 B |
| 2012/0253573 | A1 * | 10/2012 | Shigyo | B60H 1/00421 701/22 |
| 2014/0134056 | A1 * | 5/2014 | Shinoda | B01D 53/66 422/122 |

FOREIGN PATENT DOCUMENTS

| | | |
|---|---|---|
| FR | 2 376 598 A7 | 7/1978 |
| GB | 1 559 913 | 1/1980 |

OTHER PUBLICATIONS

English language abstract for EP 1 334 853 extracted from espacenet.com database on Jun. 4, 2014, 13 pages.
Machine-Assisted English translation for FR 2 276 957 extracted from espacenet.com database on Jun. 4, 2014, 18 pages.
Machine-Assisted English language abstract for FR 2 376 598 extracted from espacenet.com database on Jun. 4, 2014, 11 pages.

* cited by examiner

DEVICE FOR CONTROLLING THE FLOW OF A COOLANT, AND CIRCUIT INCLUDING SUCH A DEVICE

RELATED APPLICATIONS

This application is the National Stage of International Patent Application No. PCT/EP2012/003408, filed on Aug. 9, 2012, which claims priority to and all the advantages of French Patent Application No. FR 11/02593, filed on Aug. 25, 2011, the content of which is incorporated herein by reference.

The present invention relates to the field of devices or members intended to control a circulation of coolant in a circuit. Such a circuit forms an air-conditioning loop which interacts with a ventilation, heating and/or air-conditioning installation of a motor vehicle. Its object is such a control device, a circuit including this device and a vehicle which receives this circuit and this control device.

The increase in scarcity of oil resources is leading automobile constructors to develop vehicles which operate from new energy sources. The propulsion of the vehicle by electrical energy is a solution which represents an interesting alternative and it is then necessary to embed various components linked to the electrical traction chain such as batteries for storing this electrical energy, an electric motor which ensures the propulsion of the vehicle and an inverter which adapts the electrical signal to the motor.

The thermal conditioning of the car interior of these electric vehicles remains a function which has to be mastered. Thus, and although the internal combustion engine is absent from the vehicle, a technical solution for heating and cooling the car interior of the electric vehicle has to be found.

One solution known from the prior art consists in equipping the electric vehicle with a coolant circuit combined with a heat transfer fluid loop. In the case of range entry-level electric vehicles, this solution has to be as simple as possible in order to reduce its cost. The coolant circuit is thus limited to a compressor, a heat exchanger between the heat transfer fluid and the coolant, an expansion member, an evaporator and a coolant storage means.

Depending on the demand in the car interior, this circuit is used in a cooling mode or in a heating mode. In these two modes, the coolant circulates in one and the same direction and through the same components. In heating mode, the circuit draws the calories from the flow of air from the car interior when the latter passes through the evaporator and stores them to the heat transfer fluid loop for the latter to heat a radiator which is passed through by a flow of air sent into the car interior.

In cooling mode, the circuit also draws the calories from the flow of air sent into the car interior in its passage through the evaporator. These calories are transmitted to the heat transfer fluid via the heat exchanger between the heat transfer fluid and the coolant, the heat transfer fluid being responsible for transporting these calories to a radiator installed on the front face of the vehicle. This radiator then dissipates these calories into the flow of outside air which passes through the front face of the vehicle.

Such an architecture is satisfactory because its operation is simplified. It will be understood for example that the coolant does not undergo a reversal of the direction of circulation and is not diverted from certain components on the basis of the current operating mode. It follows that this circuit does not include any valve, inverter or any other element likely to increase the complexity of the architecture of this circuit.

Although this architecture achieves its objective of simplification, it presents the drawback of being limited in terms of thermal efficiency when the cooling mode is current. This is the consequence of the heat exchange produced between the coolant and the heat transfer fluid in the exchanger dedicated to this purpose.

The aim of the present invention is therefore to resolve the drawback described above primarily by increasing the thermal efficiency of this circuit when the latter is used in cooling mode without increasing the complexity of the coolant circuit.

The subject of the invention is therefore a device for controlling a circulation of coolant in a circuit and capable of being exposed to a flow of outside air on the front face of a vehicle, comprising a means for controlling the circulation of coolant with at least one opening placed under the control of a thermostatic detection means, in which the thermostatic detection means comprises a thermoconductive surface exposed to said flow of outside air. Such a device makes it possible to allow or prevent the circulation of coolant toward an additional component of the circuit which improves the performance coefficient of the thermodynamic cycle which takes place in the circuit when the car interior cooling mode is actuated.

According to a first feature of the invention, the thermostatic detection means is a chamber containing a control fluid and delimited on one side by the thermoconductive surface and on the other by a deformable membrane. The control fluid is, for example, and preferentially, the coolant used in the circuit. It will be understood from this that the so-called "sensitive" surface sees the temperature of the flow of outside air and is not influenced by the temperature of the coolant which passes through the control device according to the invention.

According to a second feature of the invention, the thermoconductive surface is produced in a material with a thermal conductivity at least equal to 30 $W \cdot m^{-1} \cdot K^{-1}$. It is, for example, a steel or an aluminum alloy.

According to another feature of the invention, the means for controlling the circulation of coolant comprises a seat which receives a stop plug linked to the thermostatic detection means by a rod.

According to yet another feature of the invention, the device comprises a body from which the thermoconductive surface emerges. There is thus a guarantee that the thermoconductive surface is easily exposed to the flow of outside air.

According to yet another feature of the invention, the body comprises at least one first inlet connected to a first outlet via a first duct, the circulation of coolant in the duct being placed under the control of the control means.

In this structure, the body comprises a second inlet connected to a second outlet via a second duct, the first inlet and the second outlet being connected by a means for bypassing the control means. Such a structure guarantees a return of the coolant to the remainder of the circuit when the control means is closed due to the fact that the temperature of the flow of outside air falls below a determined threshold, for example 20° C. The circuit is then operated in the heating mode.

According to an exemplary embodiment, the means for bypassing the control means comprises a duct and a head loss device.

The invention also covers a coolant circuit comprising a compressor, a first exchanger between the coolant and a heat transfer liquid fluid, an expansion means suitable for lowering the pressure of the coolant, and an evaporator intended to cool a flow of air which passes through it by heat exchange with the coolant, characterized in that it comprises a second exchanger arranged to produce a heat exchange between a flow of outside air on the front face of a vehicle and the coolant and a device for controlling the circulation of the coolant according to any one of the features presented above. Advantageously, the circulation of coolant in the second heat exchanger is placed under the control of the control device.

Provision is also made for the invention to protect a vehicle comprising a circuit as described above and a front face capable of being passed through by a flow of air outside the vehicle, said front face comprising the second exchanger, said control device being arranged on the front face so that the thermoconductive surface is exposed to the flow of outside air.

Advantageously, such a vehicle comprises an engine compartment in which is installed at least one power train of the vehicle, characterized in that it comprises a means for thermally insulating the thermoconductive surface with respect to the engine compartment.

A prime advantage according to the invention lies in the increase in thermal efficiency of the circuit when the latter is operated in cooling mode.

Another advantage lies in the simplicity of the components added to the circuit to improve this efficiency.

Another non-negligible advantage lies in the fact that the device acts automatically and independently, without needing to be electrically powered.

Other features, details and advantages of the invention will emerge more clearly on reading the description given below as an indication in relation to the drawings in which.

It should be noted that the figures show the invention in a detailed manner for implementing the invention, said figures obviously being able to be used to better define the invention as appropriate.

Figure 1:
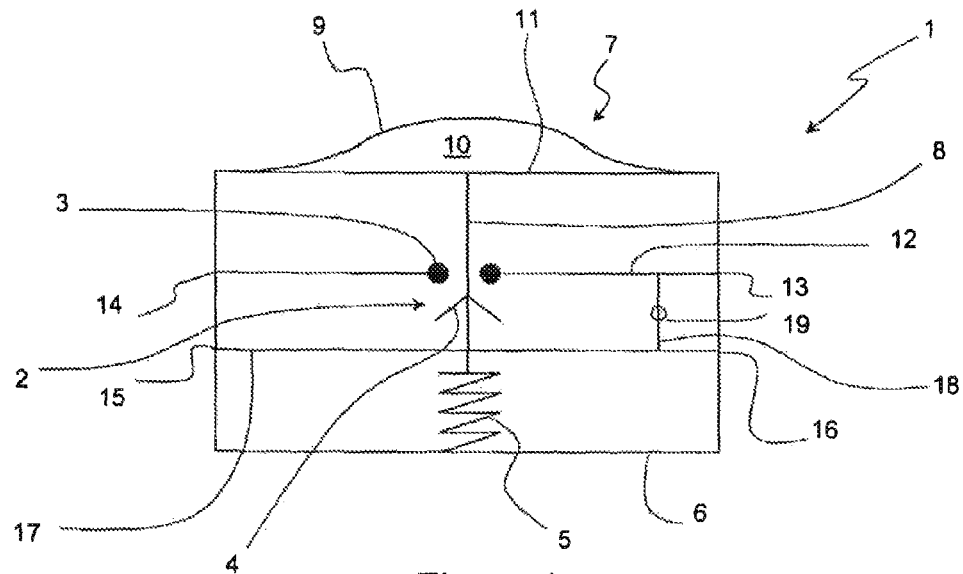
FIG. 1 is a schematic view of the control device according to the invention.

FIG. 1 schematically illustrates the structure of the control device 1 according to the invention. This device is intended to be installed at the heart of a coolant circuit in order to manage a circulation of this fluid at least in a portion of the circuit. This circuit is installed on a motor vehicle in order to generate or pick up calories sent into the car interior of the vehicle through a thermodynamic cycle operated by the coolant, otherwise called refrigerant.

From the point of view of its location on the vehicle, the control device 1 is installed in such a way that it is exposed to a flow of outside air which is about to pass through a front face of the vehicle.

This control device 1 comprises a control means 2, the function of which is to allow or prevent a circulation of coolant in the duct which receives this control means 2. This control means 2 is bistable in that it is likely to assume two extreme positions, a first position corresponding to complete opening while a second position corresponds to closure, or total blocking.

By way of exemplary embodiment, the control means 2 comprises a seat 3 which receives a stop plug 4. The seat 3 is an area of the control means on which the stop plug 4 rests in a seal-tight manner. Such a stop plug notably takes the form of a ball, but it can also be a cylindrical or tapered block. According to the example of FIG. 1, the stop plug 4 is kept pressed against the seat 3 by a spring 5, the latter on one side bearing against a body 6 constituting the control device 1, and on the other side bearing directly or indirectly against the stop plug 4.

The control device 1 also comprises a thermostatic detection means 7. The latter is linked by a rod 8 to the stop plug 4 so as to act on the displacement of this stop plug and thus open or close the control means 2.

The function of the thermostatic detection means 7 is to convert a temperature difference detected by this means into a mechanical movement, for example a rotation, or even a translation, as is the case with the solution represented in FIG. 1, notably by means of the rod 8.

The thermostatic detection means 7 comprises a thermoconductive surface 9 exposed to the flow of outside air, at the moment when the latter passes through the front face of the vehicle. This thermoconductive surface 9 forms one of the outer walls of the body 6. As an example, the thermoconductive surface 9 emerges or extends from the body which makes it possible to guarantee that the latter extends over a sufficiently wide area to detect the temperature.

The thermostatic detection means 7 is formed for example by a chamber 10 containing a control fluid. This fluid is notably identical to the coolant which circulates in the circuit so that its thermal properties induce an actuation of the control means 2 that is compatible with the operation of the circuit. It goes without saying that this control fluid can also be chosen from the following fluids known by the acronyms R134a or HFO1234yf.

The chamber 10 is delimited by two components. A first component is the thermoconductive surface 9. This surface reacts to the temperature of the flow of air which strikes it and transmits this temperature directly to the control fluid present in the chamber 10. As an example, this thermoconductive surface is produced in a metallic material such as a steel or an aluminum alloy. In any case, and to allow for a rapid reaction of the control device 1, the thermoconductive surface is produced in a material with a thermal conductivity at least equal to 30 $W \cdot m^{-1} \cdot K^{-1}$.

The second component delimiting the chamber 10 is a deformable membrane 11. It will thus be understood that the control fluid is enclosed in a volume closed by the deformable membrane 11 and by the thermoconductive surface 9. This membrane 11 is deformed under the action of the expansion of the control fluid so as to cause a displacement of the rod 8. It follows from the above that the flow of air outside the vehicle transmits its calories to the thermoconductive surface 9, which in turn acts thermally on the control fluid, the expansion of the latter causing the deformable membrane to be displaced in order to open or close the control means 2.

The body 6 of the control device is a block, for example metallic, in which is formed a first duct 12 on the path of which the control means 2 is located. This first duct 12 comprises a first inlet 13 and a first outlet 14 through which the coolant from the circuit can enter, respectively exit.

In an enhanced version of the control device 1, the body 6 also comprises a second inlet 15 connected to a second outlet 16 via a second duct 17. It will be noted that the first inlet 13 and the second outlet 16 are connected to one another by a bypass means, the function of which is to allow the passage of the coolant when the control means 2 is closed, and prevent its passage when the control means 2 is open.

This bypass means notably comprises a duct 18 on the path of which a head loss device 19 is located. Such a structure guarantees that the coolant is directed from the first inlet 13 to the first outlet 14 when the control means 2 is open. Correlatively, this duct 18 and this head loss device 19 allow a bypassing of the control device 1 according to the invention for the coolant to be able to return into the circuit when the outside temperature conditions demand closure of the control means 2. As an example, the head loss device is a valve set to a determined pressure. According to another example, the head loss device is an orifice of fixed section, its internal diameter being notably equal to 4 mm. The duct 18 and the head loss device 19 constitute a means for bypassing a second exchanger which will be detailed in relation to FIG. 2. In another alternative, the bypass means can be separate from the control means 1, which makes it possible to simplify the structure of the latter. In any case, the bypass means exhibits a headloss greater than the headloss of the portion of circuit comprising the control means 2 and the second exchanger.

Figure 2:
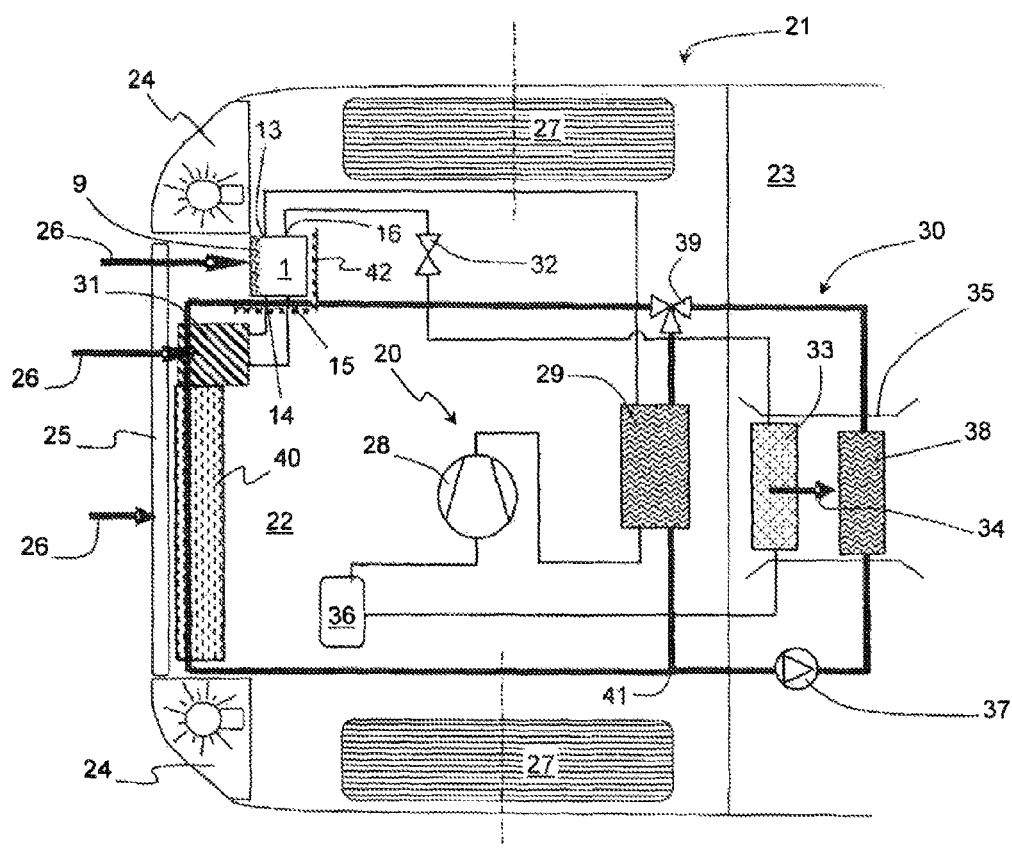
FIG. 2 is a plan view of a front part of a vehicle, illustrating the circuit and its control device according to the invention.

FIG. 2 illustrates the coolant circuit 20 according to the invention. This figure also shows a front part of a vehicle 21. This vehicle is represented in plan view and has an engine compartment 22, a car interior 23 which is only partly drawn and separated from the engine compartment by an apron, and finally two front wheels 27 of the vehicle. It is a vehicle with electrical propulsion inasmuch as the engine which drives its movement is an electric motor.

The front face of the vehicle comprises two headlights 24 and, for example, a cowling 25 arranged transversely between the two headlights. The front face is the area of the vehicle which is passed through by the flow of outside air 26 when the vehicle is set in motion.

The coolant circuit 20 comprises a compressor 28, notably electrical, the function of which is to circulate the coolant within the circuit. An outlet of the compressor is connected to an inlet of a first exchanger 29, the function of which is to produce a heat exchange between the coolant which passes through it and a heat transfer fluid, notably liquid, the latter circulating in a heat transfer fluid loop 30. The first exchanger 29 is thus a fluid/fluid heat exchanger without any area of exchange with any flow of air.

An outlet of the first exchanger 29 is connected to the first inlet 13 of the control device 1 according to the invention. The first outlet 14 of this device is connected to an inlet of a second heat exchanger 31. The function of the latter is to produce a heat exchange between the flow of outside air 26 which passes through it and the coolant which circulates in this second exchanger 31. A cooling of this coolant is thus assured.

This second heat exchanger 31 is arranged on the vehicle for example at the front face thereof.

An outlet of this second heat exchanger 31 is connected to the second inlet 15 of the control device 1. For its part, the second outlet 16 of the control device is connected with an expansion means 32.

The arrangement of the control device 1 in relation to the vehicle will most particularly be noted. In practice, the control device 1 is installed at the front face so that the thermoconductive surface 9 is exposed to the flow of outside air 26.

The function of the expansion means is to lower the pressure of the coolant during the application of the thermodynamic cycle which takes place in the circuit. This expansion means is, for example, an orifice with fixed section, a thermostatically controlled expansion valve or even an electronically controlled expansion valve.

An outlet of the expansion means 32 is connected to an evaporator 33 intended to cool a flow of inside air 34 which passes through it, by heat exchange with the coolant. The flow of inside air 34 is that which is sent into the car interior 23 in order to heat or cool the latter. The evaporator 33 is mounted in a ventilation, heating and/or air-conditioning installation symbolically represented by the reference 35.

An outlet of the evaporator 33 can be directly connected to an inlet of the compressor 28. However, FIG. 2 shows the presence of a coolant storage device inserted between the outlet of the evaporator 33 and the inlet of the compressor 28. In this configuration, it is an accumulator 36.

According to a variant embodiment, the storage device is placed on the circuit between the outlet of the first exchanger 29 and the first inlet 13 of the control device 1. In this configuration, it is a cylinder which offers the advantage of supplying the coolant in liquid phase to the control device 1. Thus, the second exchanger 31 is passed through by the coolant in the liquid state and its cooling in this state contributes to improving the coefficient of efficiency of the refrigerant circuit.

The vehicle 21 is also equipped with the heat transfer fluid loop 30 which interacts with the circuit 20 for the thermal conditioning of the car interior.

This heat transfer fluid loop 30 comprises a pump 37 which ensures the circulation of the heat transfer fluid in the loop 30. An outlet of this pump 37 is connected to an inlet of a unit heater 38 whose function is to heat the flow of inside air 34. For this, this unit heater 38 is mounted in the ventilation, heating and/or air-conditioning installation 35, in particular downstream of the evaporator 33 in the direction of displacement of the flow of inside air 34.

An outlet of this unit heater 38 is connected to a bifurcation member 39, the latter for example taking the form of a three-way valve. One of the orifices of this bifurcation member 39 is connected to a radiator 40 installed on the front face of the vehicle 21, while another orifice of the three-way valve is connected to the first heat exchanger 29, via a heat transfer fluid inlet orifice.

The function of the radiator 40 is to dissipate the calories present in the heat transfer fluid into the flow of outside air 26 which passes through it. According to an exemplary embodiment, the radiator 40 and the second exchanger 31 are arranged immediately adjacent to one another. Advantageously, a front face of the radiator 40 extends in the same plane as a front face of the second exchanger 31. According to one embodiment, the radiator 40 and the second exchanger 31 forms a unitary assembly.

An outlet of the radiator 40 is connected to a connection point 41, the latter being connected both to the inlet of the pump 37 and to a heat transfer fluid outlet orifice of the first exchanger 29.

There now follows a description of the operation of the circuit 20 and of its interaction with the heat transfer fluid loop 30.

The ventilation, heating and/or air-conditioning installation operates according to a heating mode and/or a cooling mode. On the other hand, the circuit operates in the same way in these two modes, with the exception of the control device according to the invention. In other words, the coolant circulates in the same direction in the circuit during the application of both these modes.

In cooling mode, the temperature of the flow of outside air is greater than or equal to a determined threshold, for example 20° C. The compressor 28 compresses and raises the temperature of the coolant. The latter undergoes a first cooling step by heat exchange with the heat transfer fluid in the first exchanger 29. The control device 1, which detects the temperature of the flow of outside air and considers whether the determined threshold is reached or exceeded, allows the circulation of the coolant in the second exchanger 31 where a second step of cooling of the coolant, notably in liquid phase, enhances the thermal efficiency of the circuit.

The expansion means 32 then lowers the pressure of the coolant and the evaporator 33 picks up the calories present in the flow of inside air 34.

In heating mode, the temperature of the flow of outside air is less than the determined threshold. The operation of the circuit is the same apart from the following.

The control device 1 blocks the access to the second exchanger 31 because the temperature of the flow of outside air detected by the thermoconductive surface is less than the determined threshold. The coolant is then forced to bypass this second exchanger, notably by passing through the bypass means. In a variant embodiment of the bypass means, the latter comprises the duct and the head loss device, these elements being able to be incorporated in the control device 1 according to the invention. According to another variant, these elements are separate from the control device 1. It is important in all cases that these elements form a means for bypassing the control means, and correlatively, the second exchanger 31, the output of which is upstream of the expansion means 32 in the direction of circulation of the coolant.

In this mode, the calories are drawn in the evaporator 33 by virtue of the fact that the flow of inside air 34 is all taken from inside the car interior. These calories are distributed to the heat transfer fluid via the heat exchange between the coolant and the heat transfer fluid which takes place in the first exchanger 29. The bifurcation member 39 is placed in a position where it imposes a circulation of the heat transfer fluid in the unit heater 38, thus blocking any circulation in the radiator 40. The rise in temperature of the flow of inside air 34 is thus generated in order to ensure the heating function for the car interior of the vehicle 21.

With regard to the circuit 20, it will be noted more particularly that it is the detection of the temperature of the flow of outside air 26 by the thermoconductive surface 9 which alone manages the transition from the heating mode to the cooling mode.

In an enhanced version of the invention, the control device 1 is thermally insulated from the engine compartment 22. In practice, the temperature of the air present therein is different from the temperature of the flow of outside air 26, which naturally influences the operation of the control device 1. The invention thus provides a means 42 of thermally insulating the thermoconductive surface 9 with respect to the engine compartment 22. As an exemplary embodiment, this insulation means is thermal 42 is formed by a thermal screen inserted between the control device 1 and the engine compartment 22.

The invention claimed is:

1. A device for controlling a circulation of a coolant in a circuit and capable of being exposed to a flow of outside air on the front face of a vehicle, the device comprising; a means for controlling the circulation of the coolant with at least one opening placed under a control of a thermostatic detection means, in which the thermostatic detection means comprises a thermoconductive surface exposed to the flow of outside air, the device further comprising a body from which the thermoconductive surface emerges, and wherein the body comprising at least one first inlet connected to a first outlet via a first duct, the circulation of the coolant in the first duct being placed under the control of the means for controlling, and a second inlet connected to a second outlet via a second duct, the at least one first inlet and the second outlet being connected by a means for bypassing the means for controlling the circulation of the coolant and wherein the thermostatic detection means is a chamber containing the coolant which thermally responsive to the temperature of the flow of outside air through the thermoconductive surface.

2. The device as claimed in claim 1, in which the thermostatic detection means is delimited on one side by the thermoconductive surface and on the other side by a deformable membrane.

3. The device as claimed in claim 1, in which the thermoconductive surface is produced in a material with a thermal conductivity at least equal to 30 $W \cdot m^{-1} \cdot K^{-1}$.

4. The device as claimed in claim 1, in which the means for controlling the circulation of the coolant comprises a seat which receives a stop plug linked to the thermostatic detection means by a rod.

5. The device as claimed in claim 1, in which the means for bypassing the means for controlling the circulation of the coolant comprises a bypass duct and a head loss device.

6. The device as claimed in claim 2, in which the thermoconductive surface is produced in a material with a thermal conductivity at least equal to 30 $W \cdot m^{-1} \cdot K^{-1}$.

7. The device as claimed in claim 3, in which the means for controlling the circulation of coolant comprises a seat which receives a stop plug linked to the thermostatic detection means by a rod.

8. The device as claimed in claim 1, wherein the first duct, the second duct, and the means for bypassing each having a separate flow path.

9. A coolant circuit comprising a compressor, a first exchanger arranged to produce heat exchange between the coolant and a heat transfer liquid, an expansion means and an evaporator intended to cool a flow of inside air which passes through the evaporator by heat exchange with the coolant, wherein the coolant circuit comprises a second exchanger arranged to produce a heat exchange between a flow of outside air on the front face of a vehicle and the coolant and the device for controlling the circulation of the coolant as claimed in claim 1.

10. A vehicle comprising the coolant circuit as claimed in claim 9 and a front face capable of being passed through by a flow of air outside the vehicle, said front face comprising the second exchanger, the device for controlling the circulation of the coolant being arranged on the front face so that the thermoconductive surface is exposed to the flow of outside air.

11. The vehicle as claimed in claim 10, comprising an engine compartment in which is installed at least one power train of the vehicle, characterized in that the vehicle comprises a means for thermally insulating the thermoconductive surface with respect to the engine compartment.

* * * * *